US012743399B2

(12) United States Patent
Chirayath et al.

(10) Patent No.: US 12,743,399 B2
(45) Date of Patent: Sep. 22, 2026

(54) MACHINE LEARNING DATA SET MANAGEMENT FOR DISTRIBUTION TO MACHINE LEARNING APPLICATIONS

(71) Applicant: Amazon Technologies, Inc., Seattle, WA (US)

(72) Inventors: Alex Anto Chirayath, Seattle, WA (US); Jeremy Paul Michael Feltracco, Atlanta, GA (US)

(73) Assignee: Amazon Technologies, Inc., Seattle, WA (US)

( * ) Notice: Subject to any disclaimer, the term of this patent is extended or adjusted under 35 U.S.C. 154(b) by 81 days.

(21) Appl. No.: 17/807,843

(22) Filed: Jun. 20, 2022

(65) Prior Publication Data

US 2023/0409528 A1 Dec. 21, 2023

(51) Int. Cl.
*G06F 16/16* (2019.01)

(52) U.S. Cl.
CPC .................................. *G06F 16/164* (2019.01)

(58) Field of Classification Search
CPC ..................................................... G06F 16/164
See application file for complete search history.

(56) References Cited

U.S. PATENT DOCUMENTS

| | | | | |
|---|---|---|---|---|
| 10,884,999 | B2 * | 1/2021 | Crabtree | G06N 20/00 |
| 10,984,122 | B2 * | 4/2021 | Thomas | H04L 63/1433 |
| 11,100,917 | B2 | 8/2021 | Bui et al. | |
| 2018/0114142 | A1 | 4/2018 | Mueller | |
| 2018/0268319 | A1 * | 9/2018 | Guo | G06Q 30/0204 |
| 2019/0180502 | A1 * | 6/2019 | Englard | G01S 7/417 |
| 2019/0324430 | A1 * | 10/2019 | Herzog | G06Q 50/40 |
| 2019/0354810 | A1 * | 11/2019 | Samel | G06F 18/231 |
| 2020/0151963 | A1 | 5/2020 | Lee et al. | |
| 2020/0252802 | A1 * | 8/2020 | Pachauri | H04W 12/12 |
| 2021/0004021 | A1 * | 1/2021 | Zhang | G06T 19/00 |
| 2021/0271259 | A1 | 9/2021 | Karpathy | |
| 2021/0374609 | A1 * | 12/2021 | Miserendino | G06N 20/00 |
| 2023/0049167 | A1 * | 2/2023 | Wilson | G06V 30/19107 |

FOREIGN PATENT DOCUMENTS

| | | | | |
|---|---|---|---|---|
| CN | 104471570 A | * | 3/2015 | G06F 17/30309 |

* cited by examiner

*Primary Examiner* — Mohammad Ali
(74) *Attorney, Agent, or Firm* — S. Scott Foster; Kowert, Hood, Munyon, Rankin & Goetzel, P.C.

(57) ABSTRACT

Centralized data set management techniques are implemented for data sets for machine learning applications. New data sets may be created from a search of managed data set labels. Data objects of the managed data sets that are found in the search are then used to generate a new data set. The new data set is then made available for machine learning applications to use.

20 Claims, 10 Drawing Sheets

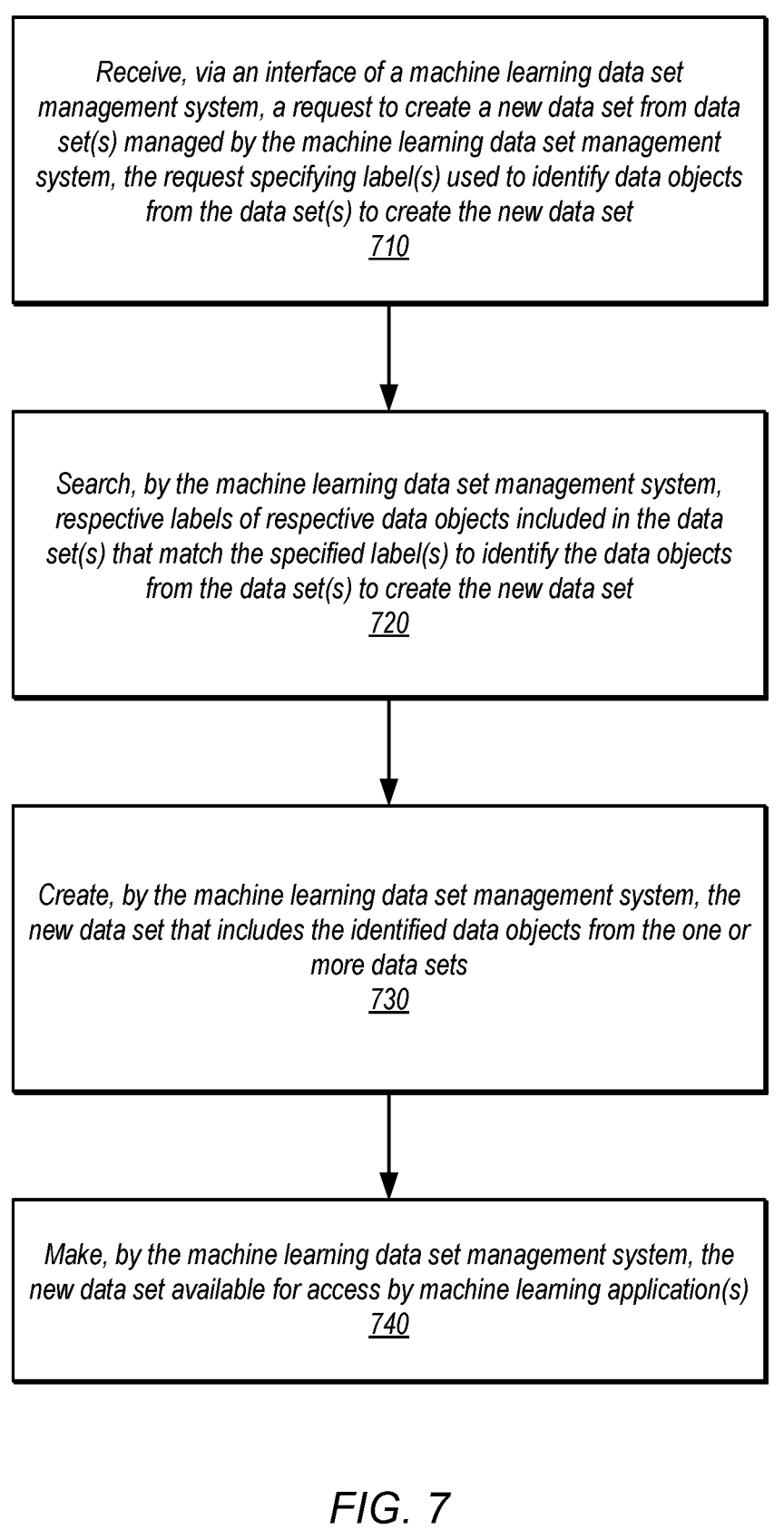

Receive, via an interface of a machine learning data set management system, a request to create a new data set from data set(s) managed by the machine learning data set management system, the request specifying label(s) used to identify data objects from the data set(s) to create the new data set
710

Search, by the machine learning data set management system, respective labels of respective data objects included in the data set(s) that match the specified label(s) to identify the data objects from the data set(s) to create the new data set
720

Create, by the machine learning data set management system, the new data set that includes the identified data objects from the one or more data sets
730

Make, by the machine learning data set management system, the new data set available for access by machine learning application(s)
740

FIG. 7

MACHINE LEARNING DATA SET MANAGEMENT FOR DISTRIBUTION TO MACHINE LEARNING APPLICATIONS

BACKGROUND

Machine-learned models and data-driven systems have been increasingly used to help make decisions in application domains such as financial services, healthcare, education, and human resources. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

BRIEF DESCRIPTION OF THE DRAWINGS

FIG. 7 is a high-level flowchart illustrating various methods and techniques for creating new data sets from managed data sets, according to some embodiments.

Figure 1:
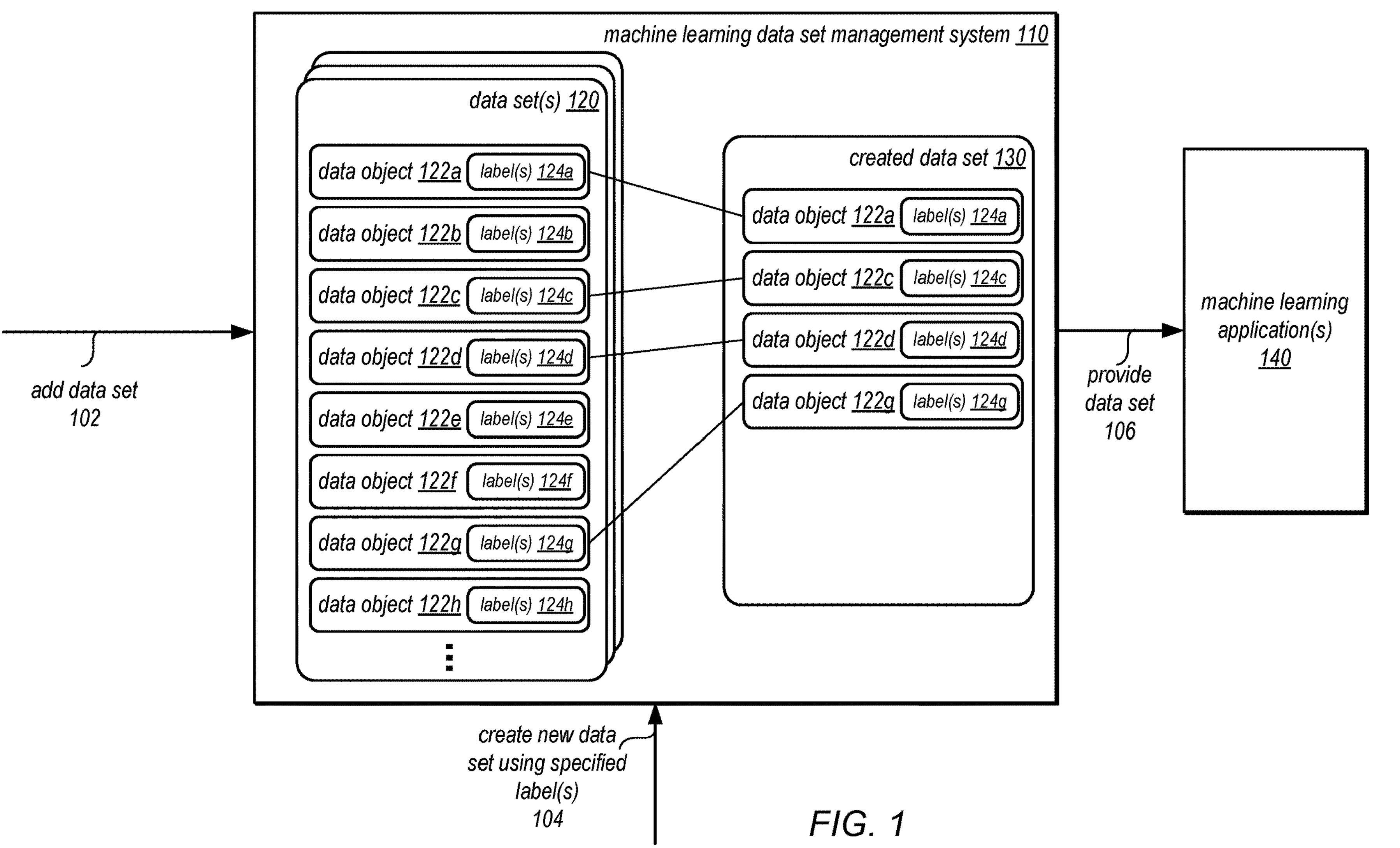
FIG. 1 illustrates a logical block diagram of data set management for machine learning, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques of data set management for machine learning are described herein. Data set preparation is among the most expensive steps in machine learning development, consuming large amounts of time (e.g., over 45% of the time). Similarly, other data set management, such as tasks for data visualization and exploration is also very time consuming (e.g., over 66% of the data scientists' time). This is because data set preparation and other management tasks are labor intensive. Moreover, the content of data sets is often hard (or impossible) to manually review. When it comes time to create a new data set for training a machine learning model, various data set management tasks include data labeling and auditing, creating data sets for experimentation, curating final data sets and data cleaning are complicated by the complexities and interrelatedness of some data sets. For example, high quality data sets may be used to produce high quality machine learning models. However, in order to obtain high quality data sets for training a machine learning model for a particular task, an understanding of the content and lineage of a data set (as well as how it is already used) may inform whether and how a given data set can be used to create a high quality data set.

Instead of relying up independent processes to prepare and manage data sets for machine learning, techniques for data set management for machine learning as described in various embodiments may provide a managed and central data hub to govern data sets across multiple machine learning projects, jobs, or other tasks. Data set management techniques may allow for data sets to be viewed, searched, and filtered to create new data sets that are subsets (sometimes referred to as slices) that can then be used for various machine learning applications (e.g., for training, labeling, analysis, or various other machine learning applications as discussed in detail below). Moreover, because data management techniques offer a centralized system for managing and interacting with data sets, various out of the box features such as data analysis and exploration including auto-curation of datasets, auto grouping of similar items, auto exploratory data analysis (EDA) as well as data pre-processing steps such as auto anonymization of personally identifying information among other processing tasks may be performed. Such techniques may, in various embodiments, allow for the creation of high quality data sets which increase the availability of and performance of many different systems, services, and applications which rely upon the resulting high quality machine learning models to perform various operations or tasks.

Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," or a "prediction" during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. Computer vision machine learning models, for example, may be trained using training data sets of image data and may also make inferences to perform various computer vision tasks, such as image classification, object detection, or image regression, among others.

FIG. 1 illustrates a logical block diagram of data set management for machine learning, according to some embodiments. Machine learning data set management system 110 may be a stand-alone system, service, or application (e.g., which may connect to and coordinate data set management of remotely stored (or locally stored) data sets. In some embodiments, machine learning data set management system 110 may be implemented as part of a provider network, such as provider network 200 discussed in detail below with regard to FIG. 2, in order to coordinate data set management amongst various internal data storage and machine learning services internal to or external from the provider network implementing the service.

Machine learning data set management system 110 may support various data set management features. Although not illustrated, machine learning data set management system 110 may implement various features such as those discussed in detail below with regard to FIGS. 3-6, like various data set search, exploration, lineage tracking analysis and visualization, data set sharing, data set importation, synthetic data generation, among other features. Another feature that implemented by machine learning data set management system 110 is the creation of new data sets 130 from the data objects 122 and corresponding labels 124 of other data sets 120. A new created data set 130 may be provided to one or more machine learning applications 140 for further processing.

For example, one or more data set(s) 120 may be imported or otherwise added 102 to machine learning data set management system 110 for management. Machine learning data set management system 110 may index, analyze, or otherwise make searchable these data sets 120. For example, a data set may include one or more data objects, such as data objects 122*a*, 122*b*, 122*c*, 122*d*, 122*e*, 122*f*, 122*g*, and 122*h*, along with one or more corresponding label(s) 124*a*, 124*b*, 124*c*, 124*d*, 124*e*, 124*f*, 124*g*, and 124*h* may be added, as indicated at 102. Data objects for data sets may be records, files, text, images, video, audio, or various other data items which may be used train different machine learning models perform a variety of different tasks. Labels for data sets may identify or otherwise provide a description, value, or other information that can allow a machine learning technique to train a machine learning model. For example, for machine learning techniques that perform computer vision tasks, a label may be applied to a data object with image data (e.g., corresponding to a bounding box or other location information of the object within the image data) that describes or otherwise identifies the object (e.g., tree, car, animal, person, etc.). For other machine learning tasks, such as natural language tasks or audio processing, labels may identify various features of the text or audio for training different machine learning model implemented tasks (e.g., sentiment or intent of text, or the text of audible speech or classification of noises).

In at least some embodiments, labels may be specified according to a taxonomy. A taxonomy may provide the various labels (as well as one or more attributes of the label and/or structure or relate labels (e.g., into categories)) which may be used to identify content or features of a data object in a data set. For example, the taxonomy may specify which labels and attributes are selectable when executing a data labeling application (e.g., for labeling by a human workers using the data labeling application or an automated labeling system that applies various techniques for data labeling).

Once made searchable (or made searchable upon demand, such as in response to a request create a new data set 140), machine learning data set management system 110 may allow for the creation of new data sets, such as created data set 130 from data sets 120. For example, the request 104 to create the new data set may specify one (or more labels) to use to create the new data set. To create a data set of image data, for example, the request may specify labels such as "traffic signs", which may allow machine learning data set management system 110 to search labels to identify and include those data objects with "traffic sign" labels (e.g., including data objects 122*a*, 122*c*, 122*d*, and 122*g* in created data set 130).

Created data sets, such as created data set 130, may be provided 106 for various different machine learning applications. For example, machine learning application(s) 140 may be training systems for machine learning models, which may be used to train, refine, test, or otherwise develop machine learning models. Machine learning applications 140 may also include other data processing applications which perform machine learning-related tasks. For example, machine learning application(s) 140 may include applications that utilize machine learning models to perform additional processing or analyses of the provided data set. Continuing with the above example, an image recognition application may be used to, for example, recognize and classify the respective traffic signs in crated data set 130, adding additional labels, for instance to specify what type of traffic sign is included. Some machine learning applications 140 may include data labeling, data visualization or statistical analyses, or various other applications that utilize machine learning techniques (or are utilized for machine learning techniques).

Please note that the previous description of is a logical illustration of a machine learning data set management system and thus is not to be construed as limiting as to the machine learning system.

This specification continues with a general description of a provider network that implements multiple different services, including a machine learning data set management service for various other machine learning applications, some of which may be hosted or implemented as part of the provider network. Then various examples of, including different components/modules, or arrangements of components/module that may implement data set management for machine learning are discussed. A number of different methods and techniques to implement data set management for machine learning are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
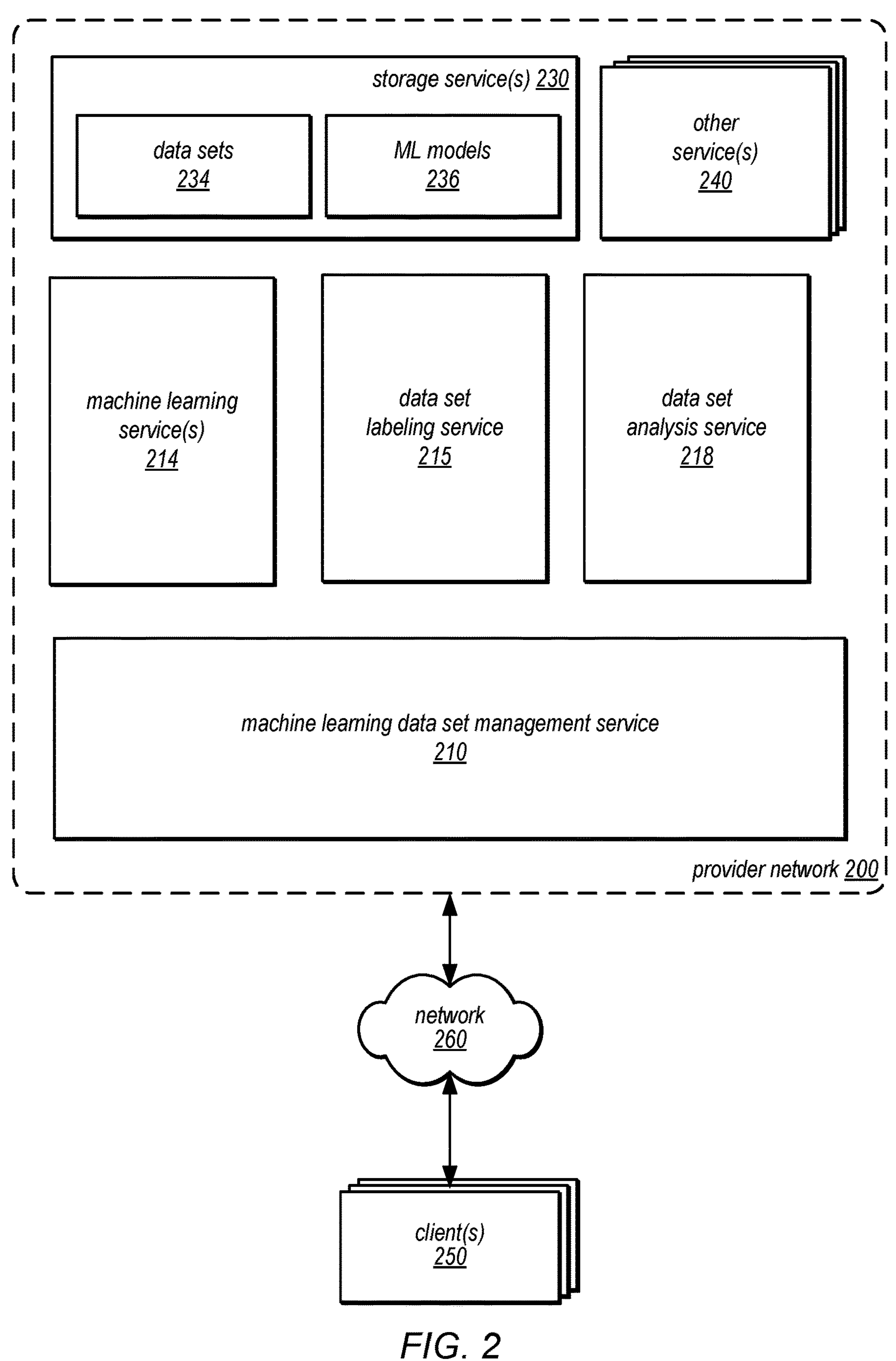
FIG. 2 illustrates an example provider network that may implement a machine learning data set management service, according to some embodiments.

FIG. 2 illustrates an example provider network that may implement a machine learning data set management service, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and services offered by the provider network 200, in one embodiment. In some embodiments, provider network 200 may implement various computing resources or services, such as machine learning data set management service 210, machine learning service(s) 214, data set labeling service 215, data set analysis service 218, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below, in one embodiment. In various embodiments, the functionality of a given system or service component (e.g., a component of machine learning data set management service 210 may be implemented by a particular node or may be distributed across several nodes. In some embodiments, a given node may implement the functionality of more than one service system component (e.g., more than one data store component).

Machine learning data set management service 210 may implement various techniques for data set management for machine learning, as discussed in detail below with regard to FIGS. 3-8. For example, machine learning data set management service 210 may provide, among other features, a central data set management hub. A central unified hub may be implemented to manage and maintain account, user, or organization machine learning data sets. Engineers and scientists, for instance, can easily explore and manipulate these datasets, create different versions and analyses for their different downstream consumption processes and share across teams easily. Machine learning data set management service 210 may also provide integration with other artificial intelligence and other machine learning services, such as services 214. Seamless integration with these services may make it easier to get to model development. For example, in data labeling, direct integration with data labeling service 215 and machine learning services 214 may allows users to ingest data, visualize/curate data, label the data as well as audit the data and its labels easily which can significantly accelerate data preparation. Machine learning data set management service 210 may provide out-of-the-box machine learning. For example, machine learning-powered capabilities such as auto-curation auto-EDA, and auto-anonymization helps reduce the heavy data engineering and analysis invest from machine learning developers and focus on the actual model development. Support for bring-your-own-model (BYOM) makes it easy for users do bring in their own machine learning powered data automation. Machine learning data set management service 210 may provide lineage and auditability. For example, users can have a complete view of when and where their data sets and subsets of data sets are being used and can track how the data set and its metadata (including annotations/labels and attributes) are managed. Machine learning data set management service 210 may provide visualization and analytics. For example, users can use the in-built support for EDA (include machine learning powered powered auto-EDA) and visualization to help explore their datasets. With support for different machine learning formats such as COCO and MOT/TFrecord formats, it also enables support to easily import/export data sets and build analyses over them.

Machine learning services 214 may include various different types of machine learning-enabled or machine learning development and deployment services which may use (and generate) data sets to be managed machine learning data set management service 210 (e.g., similar to machine learning applications 140 discussed above with regard to FIG. 1). For example, machine learning service(s) 214 may include various services that deploy trained machine learning models to analyze documents, image files, monitor metrics, perform time series predictions, generate item recommendations, translate text, transcribe audio, augment data, generate programming code, perform voice commands or other dialogue driven applications, or various other machine learning tasks. Each of these different services may implement respective interfaces for the request or performance of different tasks using machine learning models (e.g., to produce inferences or other predictions).

In some embodiments, machine learning services 214 may include a machine learning service for developing and deploying custom machine learning models. For example, such a machine learning service 214 may implement interface to allow clients (e.g., client(s) 250 or clients implemented internally within provider network 200, such as a client application hosted on another provider network service like an event driven code execution service or virtual compute service) to compress, train, and deploy machine learning models (e.g., neural networks) and/or utilize data labeling systems. For example, machine learning service 214 may implement an interface (e.g., a graphical user interface, programmatic interface that implements Application Program Interfaces (APIs) and/or a command line interface) may be implemented so that a client can submit, edit, or otherwise implement various different model development, deployment, labeling or other management requests. For example, the interface may include a development and deployment environment, which may provide a training script or other code editor with various development tools to create, submit, and/or monitor machine learning pipeline with a training job and/or monitoring job. The development and management environment may be a graphical interface, in some embodiments, and may provide an interface to past results generated for other models, in some embodiments.

This machine learning service 214 may implement model development to develop, configure, program, define, and/or otherwise execute training jobs on various machine learning models using data sets, such as data sets 234 in storage services 230 across one or more training nodes (which may include one or more respective processing devices for training, such as GPUs). In some embodiments, the machine learning service 214 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, the development environment, and executed. Various tests or other development operations for machine learning models may also be performed. In some embodiments, the various files, configuration information, and other data for machine learning model development may be organized as a project (or other collection) and stored, versioned, or otherwise managed by model development (e.g., as a collection of one or more files or data objects in storage services 230, including data sets 234 and ML models 236). Training jobs may be submitted to training nodes (e.g., via the development environment or other interfaces) to train machine learning models on identified data set(s).

In various embodiments, this machine learning service 214 may also implement model deployment, which may deploy a trained machine learning model on resources (e.g., virtual compute instances or containers) to receive and return inferences or other results according to requests or other inputs to the deployed model. For example, different types or configurations of resources (e.g., virtual compute instances with various hardware capabilities, including different amounts of processing capacity, memory, storage, and/or specialized hardware, such as GPUs and tensor processor units (TPUs)) may be provisioned or otherwise obtained from other services of provider network 200 (e.g., a virtual compute service) and then the machine learning model deployed to that provisioned resource along with various software or other applications to support the receipt of requests for inferences and return inferences.

Data set labeling service 215 may be implemented in some embodiments. Data set labeling service 215 may be another example of a machine learning application 140 discussed above with regard to FIG. 1. For example data set labeling service 215 may host, implement, manage, and/or execute data labeling applications to label data sets 234 for training and developing machine learning models. Data set labeling service 215 may handle the management of different taxonomy versions, which may be stored in (or more) storage service(s) 230. Data set labeling service 215 may also implement various features to manage execution of data labeling applications in various embodiments. For example, similar to model development and model deployment discussed above for machine learning service 214, one or more nodes or other computing resources may be managed by data set labeling service 215 in order to generate and execute a data labeling application. Different data labeling jobs may be used to instantiate and execute a data labeling application. For instance, different parameters to specify or otherwise configure the interface of a data labeling application, the input data set(s), the taxonomy (in some embodiments), or various other parameters for the data labeling application Data set labeling service 215 may then generate (e.g., modify a data labeling application according to the received parameters) and then install or otherwise deploy the application to the provisioned nodes.

Data set analysis service 218 may be implemented in some embodiments. Data set analysis service 218 may be another example of a machine learning application 140 discussed above with regard to FIG. 1. Data set analysis service 218 may perform various statistical analyses (e.g., data distributions), generate visualizations, and/or perform other summarize data sets. In this way, data set analysis service 218 can take a created data set and add or enrich metadata or other information for the data set to be useful in various development or deployment activities using the data set for a machine learning model.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to create a new data set or interact with machine learning data set management service 210 or another service of provider network 200). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to configure or perform explanation jobs) via network 260, in one embodiment. In various embodiments, network 260 may encompass any suitable combination of networking hardware and protocols necessary to establish networkbased-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
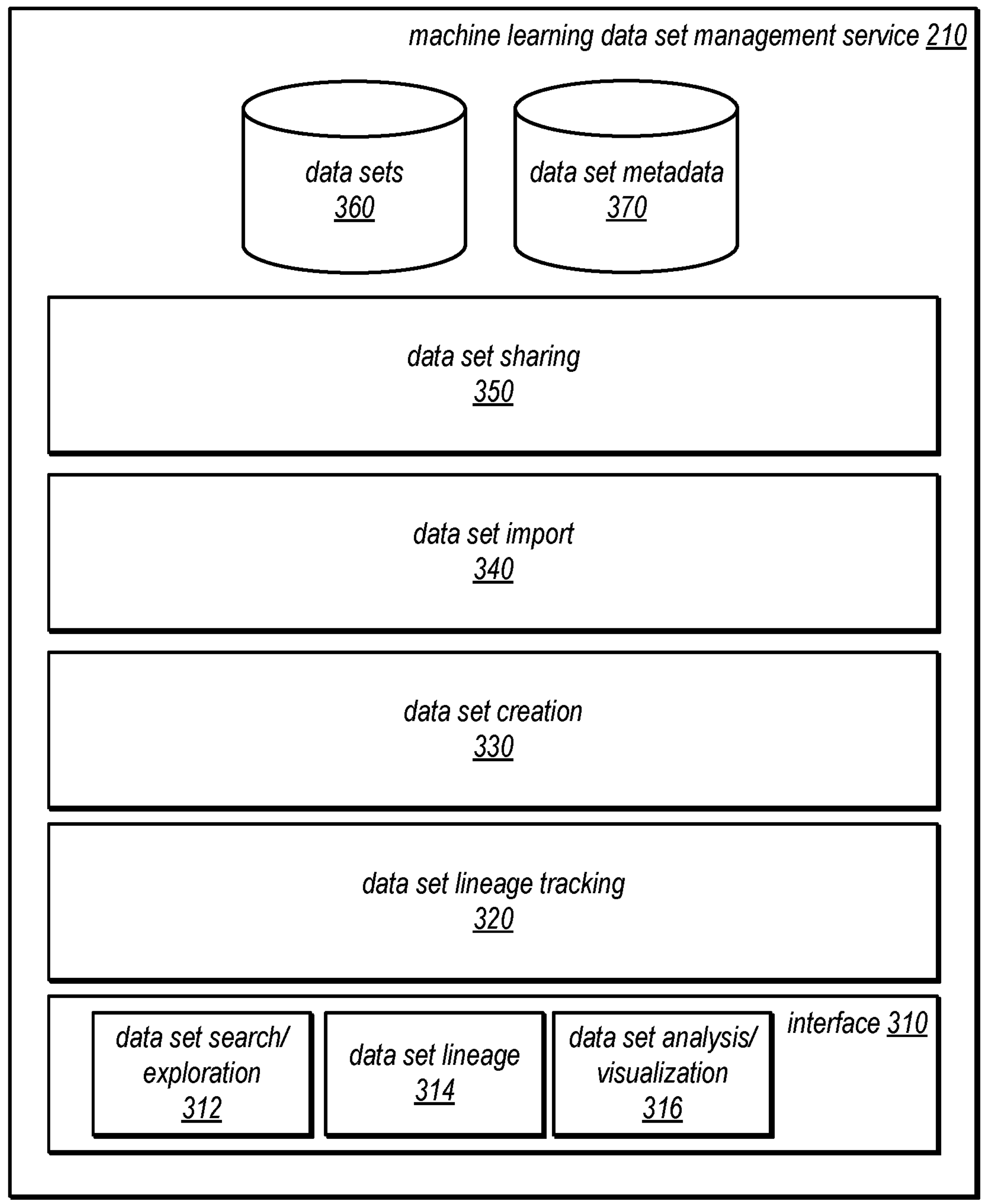
FIG. 3 illustrates a logical block diagram of a machine learning data set management service, according to some embodiments.

FIG. 3 illustrates a logical block diagram of a machine learning data set management service, according to some embodiments. For example, machine learning data set management service 210 may implement interface 310. Interface 310 may include various types of interfaces, programmatic (e.g., using one or multiple APIs), graphical (e.g., a web-based console or other visual interface), and/or a command line interface. Interface 310 may provide a centralized interface for various data set management features. In this way, machine learning data set management service 210 may act as a central hub for data sets for machine learning activities. For example, interface 310 may implement data set search and exploration features 312. Data set search 312 may provide various indexing or other search capabilities for identifying data sets and/or data objects within data sets which may satisfy search criteria. Various techniques to support data set search may be implemented. Database systems, which may implement various scanning, indexing or other search features may be used to store the data set itself or metadata for the data set. Supported searches may include text based searches for text strings or other text-based predicates or criteria which may be compared with labels of data objects, as discussed above with regard to FIG. 1. Visual searches (e.g., by providing an example image data object), audio searches, or other types of search interfaces may also be supported.

Similarly, exploration features 312 may allow for viewing data objects of data sets. For example, a search for image data objects with a label criteria (e.g., for fruit), cause the search results to be displayed (e.g., in paginated form). Moreover, further sub-categories (e.g., specific attribute values or further labels) may be provided for the displayed image data objects, to further select or filter subsets of the image data objects for display (e.g., to select "apples").

Another feature supported by interface 310 may be data set analysis and visualization 316. Data set analysis and visualization 316 may interface with various analysis tools or services (not illustrated). For example, a statistical analysis tool that may generate scatter plots or histograms for value distributions of data objects may be performed and returned via 316. Similarly, various other features, such as bias analysis or other analyses that may be used to understand the strengths and weaknesses of a data set may be performed and results provided.

Machine learning data set management service 210 may implement data set lineage tracking 320 and, correspondingly, features for viewing data set lineage 314 as part of interface 310. For example, data set lineage information may be visually displayed (e.g., as a graph) or described (e.g., as a change log). Searches for versions, modifications, time ranges, or other metadata that corresponds to different data set versions may be supported for data set lineage interface features 314.

Data set lineage tracking 320 may main a historical record (e.g., via access logs, transformation workflows, or other records) that describe when a data set is selected, modified, created, or provided to various machine learning applications. Data set lineage information may be maintained as part of data set metadata 370 and may be updated by data set lineage tracking 320 when this history should be updated. Therefore, data set lineage tracking 320 may be invoked as part of various data set management requests or workflows performed by machine learning data set management service 210 and other machine learning applications. For example, when a data set is used as part of training or developing a machine learning application in a machine learning service 214, this use may be recorded as part of data set lineage history. In some embodiments, the lineage of data set may be a lineage of changes, including the modifying application, system, or service (and possibly user, account or other entity information as part of that modifying application, system, or service). Lineages of a data set may also include the sources of that data set. Thus, as discussed above with regard to FIG. 1, a request create a new data set from one or more managed data sets, may result in the source data sets from which data objects are found for inclusion in the new data set may also be recorded in the data lineage. In some embodiments, data set lineages may track changes as different versions and may maintain the different versions as part stored data sets 360, in order to allow for different versions to be interacted with and/or modified differently (e.g., creating forks or branches in the data lineage of a data set in multiple versions descending from one data set version).

Other features of machine learning data set management service 210 include data set creation 330, which is discussed in detail below with regard to FIG. 5, and data set import, which is discussed in detail below with regard to FIG. 6. Another feature may be data set sharing 350. Data set sharing 350 may facilitate providing access to or copies of various data sets managed by machine learning data set management service 210. For instance, provider network 200 may implement an access management service that verifies identity and authorization of users of various provider network services to utilize resources in the provider network. Data set sharing 350 may interact with this access management service to control access to different data sets. For example, various organizational entities, such as accounts, users, roles, or other identities may be used to determine which data sets can be accessed for various management activities, including creation. Therefore, data set sharing 350 may also support the modification of or granting access rights to different identities (e.g., accounts, users, or roles) in order to share a data set. A request, for example to share a data set with a specified identity may be validated (e.g., determined to be authorized to share the data set), and the various access control modifications may be performed to facilitate the sharing. In some embodiments, data set sharing may include making copies or transferring data sets to other storage locations as part of sharing that data set. Thus data set sharing 350 may orchestrate the various file or other data movement actions (e.g., instructing copies, file transfers, or other APIs) to make the data set be located for use by a recipient of data sharing.

Data sets 360 and metadata 370 may be stored as part of the service, in some embodiments, on dedicated storage subsystems. In some embodiments, data sets 360 and metadata 370 may be stored as part of other services of provider network 200 (e.g., data storage services 230 as discussed above with regard to FIG. 2).

Figure 4A:
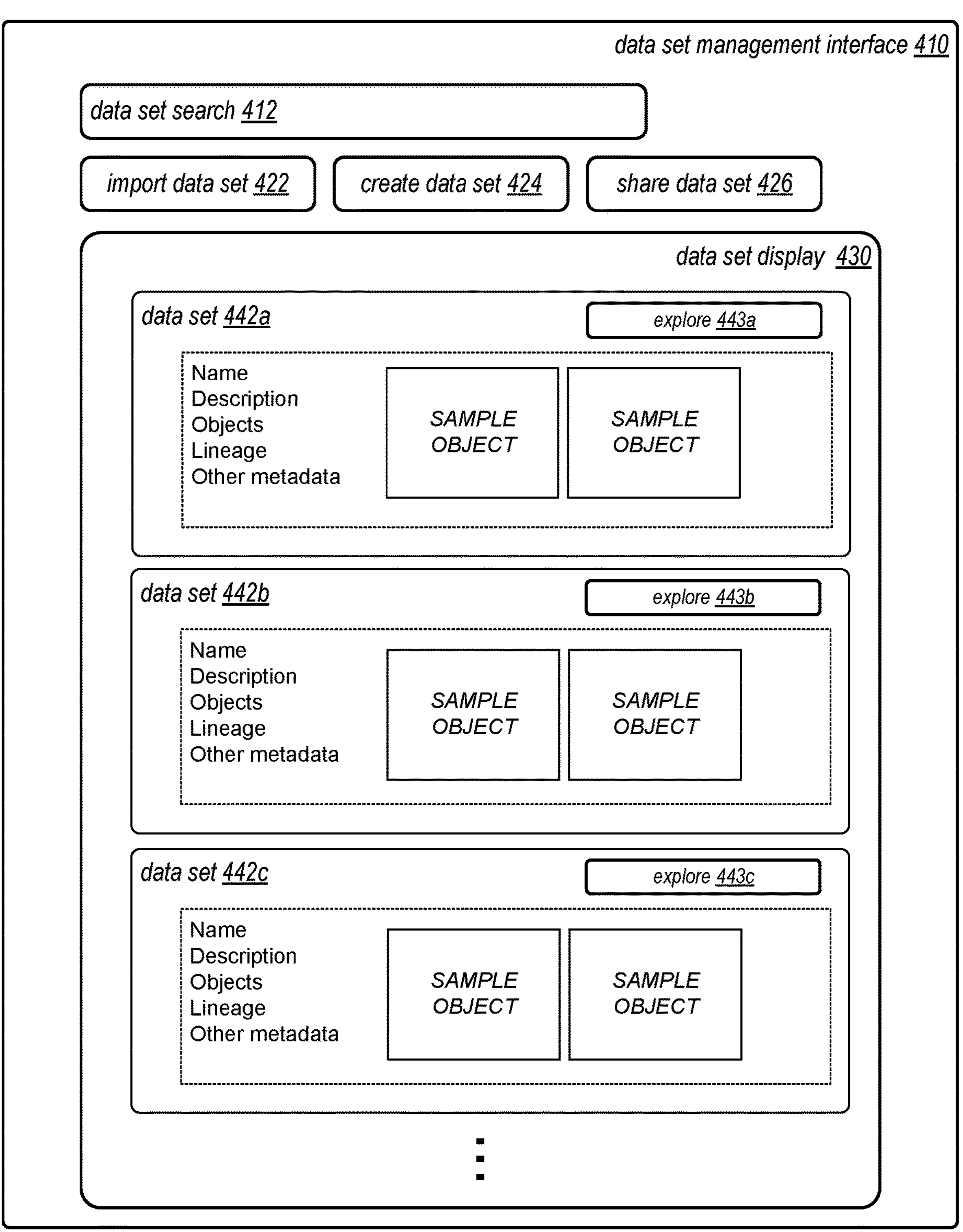
FIG. 4A illustrates an example data set management interface, according to some embodiments.

FIG. 4A illustrates an example data set management interface for searching and exploring data sets, according to some embodiments. Data set management interface 410 may provide various features or user interface elements and thus the following examples are not intended to be limiting. For example, a data set search 412 may be supported to find data sets based on data set lineage information, description, objects, labels, attributes, or various other information. Elements to import or add new data sets 422 may be implemented, triggering various displays or related user interface elements to instruct or configure the performance of techniques discussed below with regard to FIG. 5, as can elements to create a data set 422 triggering various displays or related user interface elements to instruct or configure the performance of techniques discussed below with regard to FIG. 5, or share a data set 426 (e.g., with other users of the service 210), as discussed above with regard to FIG. 3.

Data set display 430 may provide various data sets that are available for management (or are requested in a search at 412). Each data set (442*a*, 442*b*, and 442*c*) may include various information such as a name, description, number of objects, lineage information and/or other metadata, as well as samples of the objects (e.g., picture tiles for image data objects). Explore elements 443*a*, 443*b*, and 443*c*, may allow for a user to explore an individual data set for further information.

Figure 4B:
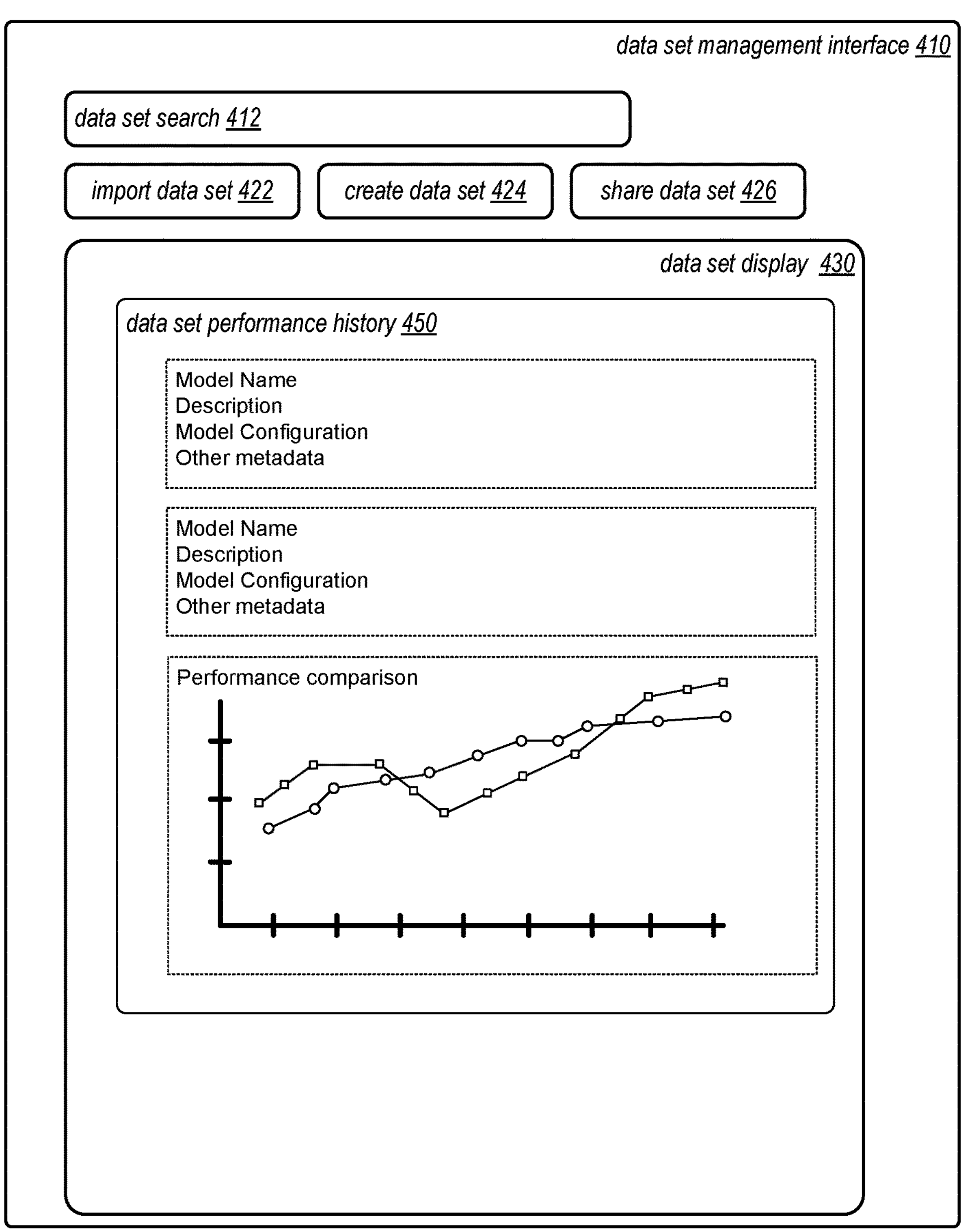
FIG. 4B illustrates an example data set management interface comparing results of different uses of a data set, according to some embodiments.

Various usage information that is tracked for data sets may be available for display or access. One such use case may be performance of analysis. FIG. 4B illustrates an example data set management interface comparing results of different uses of a data set, according to some embodiments. The data set may be selected using the various interface elements discussed above. Data set performance history 450 may be selected to provide a performance comparison between different model uses for training or testing on the data set. For example, the model names, descriptions, configurations, or any other information/metadata for the models may be provided along with a visualization of performance (e.g., according to various benchmarks, metrics, or other indicators of performance) as shown in performance history 450. This performance comparison may be requested via interface 410 (e.g., as part of exploring a data set's history or use).

Figure 5:
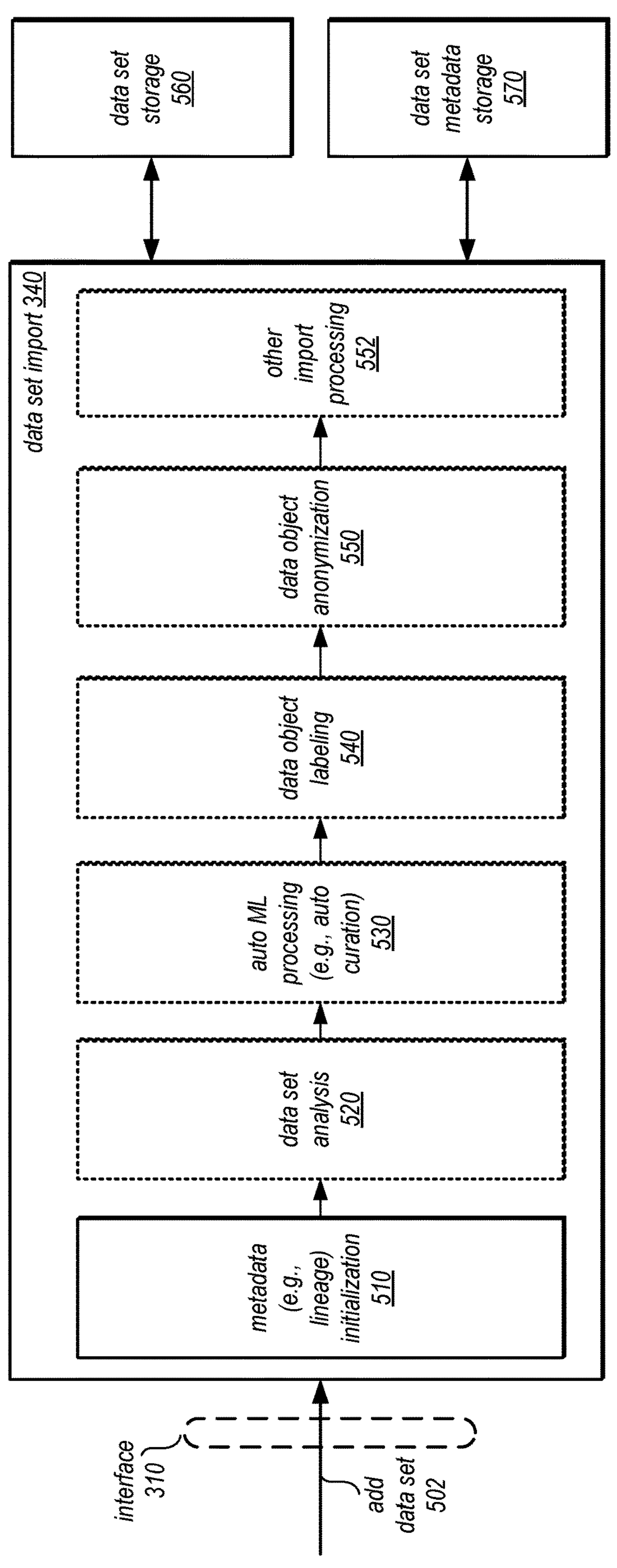
FIG. 5 illustrates a logical block diagram illustrating data set import, according to some embodiments.

FIG. 5 illustrates a logical block diagram illustrating data set import, according to some embodiments. Data set import may 340 may receive a request to add a data set, as indicated at 502. Various import tasks for processing the additional data sets may be performed (e.g., accessing storage locations, initiating data transfer to import processing location, etc.). The data sets may be obtained and metadata initialization may be performed, as indicated 510. For example, the various records, data structures or other information used to track accesses or other lineage data may be set up. A table, index, or other structure for maintaining and/or searching the data set may be created or added.

In some embodiments, further data set processing may not be performed (e.g., as may be specified in parameters of add data set request 502). In some embodiments, other data processing tasks may be performed (e.g., as specified in parameters of add data set request 502). Although illustrated as being performed as part of data set import 340, such tasks may also be selected, requested, or performed at a later time.

Examples of other data set processing tasks may include (but are not limited to), statistical analysis performed at data set analysis 520 (e.g., to provide for explorative data analysis, such as through statistical modeling or graphical display of data set characteristics or features, such as histograms), automated machine learning processing 530, such as various techniques to group or curate data objects, such as by performing classifications, recognition, or other techniques using various machine learning models that accept data objects (or portions thereof) as input. Data object labeling 540 may be performed, through data labeling applications (e.g., managed by data set labeling service 215 as discussed above with regard to FIG. 2) generated and used to provide human annotators with labeling options or through automated (e.g., ML model-based) labeling, such as may be performed by machine learning services 214. In some embodiments, data object anonymization techniques may be implemented, as indicated at 550. For example, personal identifying information, such as various identifiers, may be removed along with other personal information (e.g., by applying various regular expression filters on text data, face blurring or other image modification features on image data, voice masking or other audio data modification features on audio data). Various other import processing tasks may be performed as well as those examples provided above, as indicated at 552. The processed data sets may be stored in data set storage 560 (which may be a separate storage service or an internally implemented storage system). Similarly, metadata for data sets may be stored as part of metadata storage 570.

Figure 6:
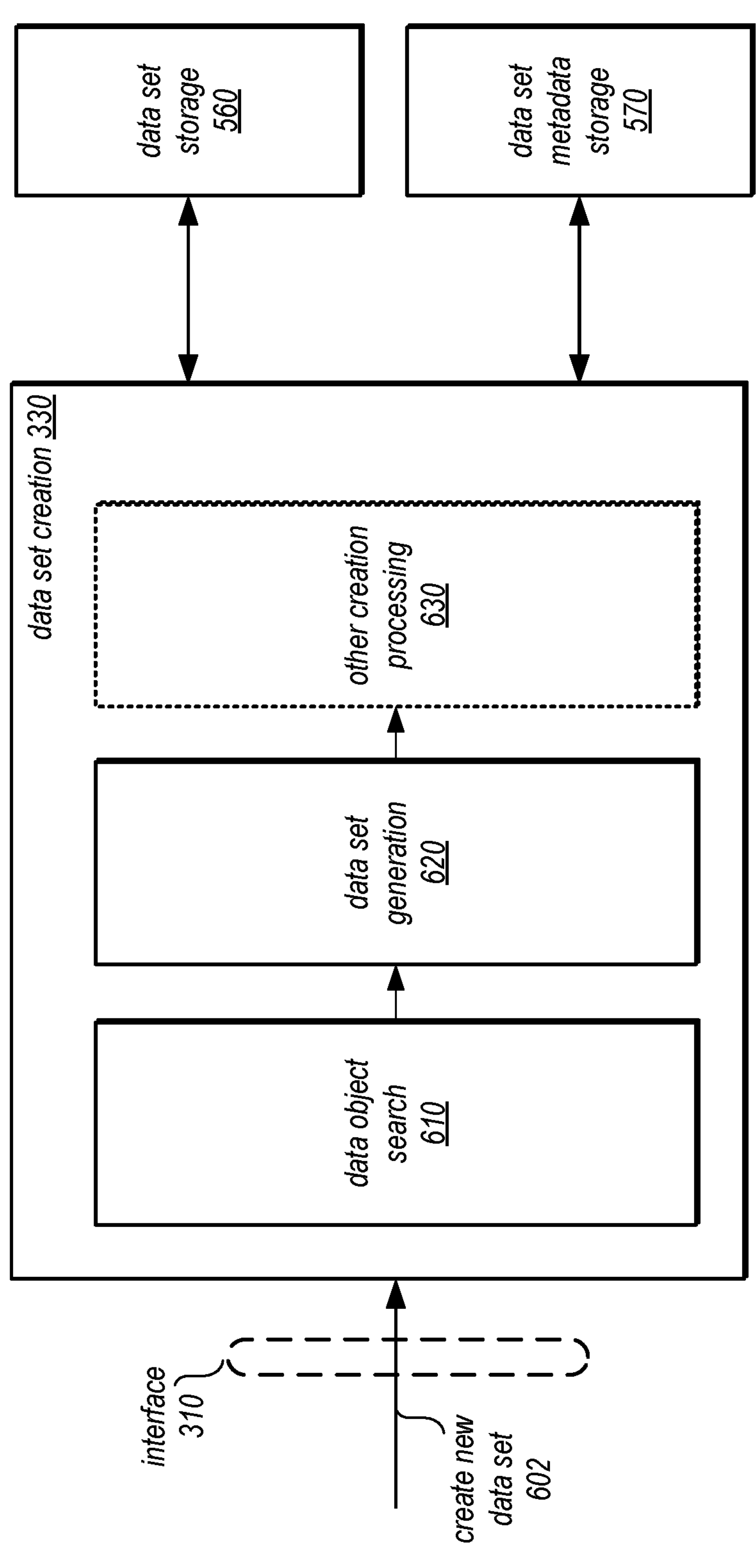
FIG. 6 illustrates a logical block diagram illustrating data set creation, according to some embodiments.

FIG. 6 illustrates a logical block diagram illustrating data set creation of a machine learning data set management service, according to some embodiments. Interface 310 may support a request to create a new data set, as indicated at 602. The request may specify labels and attributes that are used to identify data objects to include in the new data set. Data object search 610 may perform a search using the specified labels and attributes. For example, an index may be created for the various labels and attributes that are included data sets to be searched (e.g., as part of data set metadata storage 570 and/or data set storage 560).

Once the data objects that match or otherwise satisfy the labels and/or attributes in the create new data request, data set generation 620 may be implemented to create the new data set. Creation of the new data set may involve generating or initializing metadata (e.g., lineage data) for the new data set, making copies of data objects (or linking to data objects in the source data sets) and storing the new data set in data set storage 560. In some embodiments, other processing tasks, (e.g., similar to this discussed for import) may be performed, in some embodiments, as indicated at 630. For example, auto ML or other techniques may be applied to the data objects.

In some embodiments, data set generation 620 may include synthetic data object generation for inclusion in the new data set (or in a different new data set). For example, obtained data objects as a result of data object search may be copied and modified (e.g., by adding noise) in order to increase a number of data objects in the data set. These synthetically generated data sets may be then be added to the new data set that has been created, in some embodiments.

Although FIGS. 2-6 have been described and illustrated in the context of a provider network implementing a machine learning data set management service, the various components illustrated and described in FIGS. 2-6 may be easily applied to other machine learning systems that use data sets for training machine learning models. As such, FIGS. 2-6 are not intended to be limiting as to other embodiments of performing machine learning data set management techniques.

FIG. 7 is a high-level flowchart illustrating various methods and techniques for creating new data sets from managed data sets, according to some embodiments. As indicated at 710, receive, via an interface of a machine learning data set management system, a request to create a new data set from data set(s) managed by the machine learning data set management system, the request specifying label(s) used to identify data objects from the data set(s) to create the new data set. For example, the request may be received via visual exploration or graphical user interface that may display available categories of labels that can be found in a data set, one of which may be selected via the graphical user interface. In some embodiments, the request to create the data set may include a query statement, set of criteria, or other predicates which may be used to search labels (e.g., as a text string).

As indicated at 720, search, by the machine learning data set management system, respective labels of respective data objects included in the data set(s) that match the specified label(s) to identify the data objects from the data set(s) to create the new data set. For example, search indexes may be generated and maintained for data set labels that support, for example string comparison for exact text or fuzzy text matches (e.g., matches within a tolerance of difference value). In some embodiments, data objects may be stored as records in a database or other data storage system that utilizes indexes, scans, or other database operations to find data records with a field or other value that matches the label(s) specified in the request.

As indicated at 730, create, by the machine learning data set management system, the new data set that includes the identified data objects from the one or more data sets. As discussed above, creation of the new data set may involve generating or initializing metadata (e.g., lineage data) for the new data set, making copies of data objects (or linking to data objects in the source data sets) and storing the new data set in data set storage. In some embodiments, other processing tasks, (e.g., similar to this discussed for import in FIG. 5 or creation in FIG. 6) may be performed (e.g., including, but not limited to data set analysis, auto ML processing, data object labeling, and data object anonymization). Synthetic data object generation for inclusion in the new data set may be performed in some embodiments.

As indicated at 740, make, by the machine learning data set management system, the new data set available for access by machine learning application(s). For example, metadata that lists, tracks, or identifies available data sets may be updated. In some embodiments, the data set may be provided (e.g., sent to or made accessible to) the machine learning applications. The storage location, for example, may then be provided, from the metadata, for a requesting machine learning application to use the created data set. As discussed above with regard to FIG. 1, machine learning applications may include training, development, and deployment systems for machine learning models, which may be used to train, refine, test, or otherwise develop machine learning models, as well as other data processing applications which perform machine learning-related tasks such as applications that utilize machine learning models to perform additional processing or analyses of the provided data set, data labeling, data visualization or statistical analyses, or various other applications that utilize machine learning techniques (or are utilized for machine learning techniques).

Figure 8:
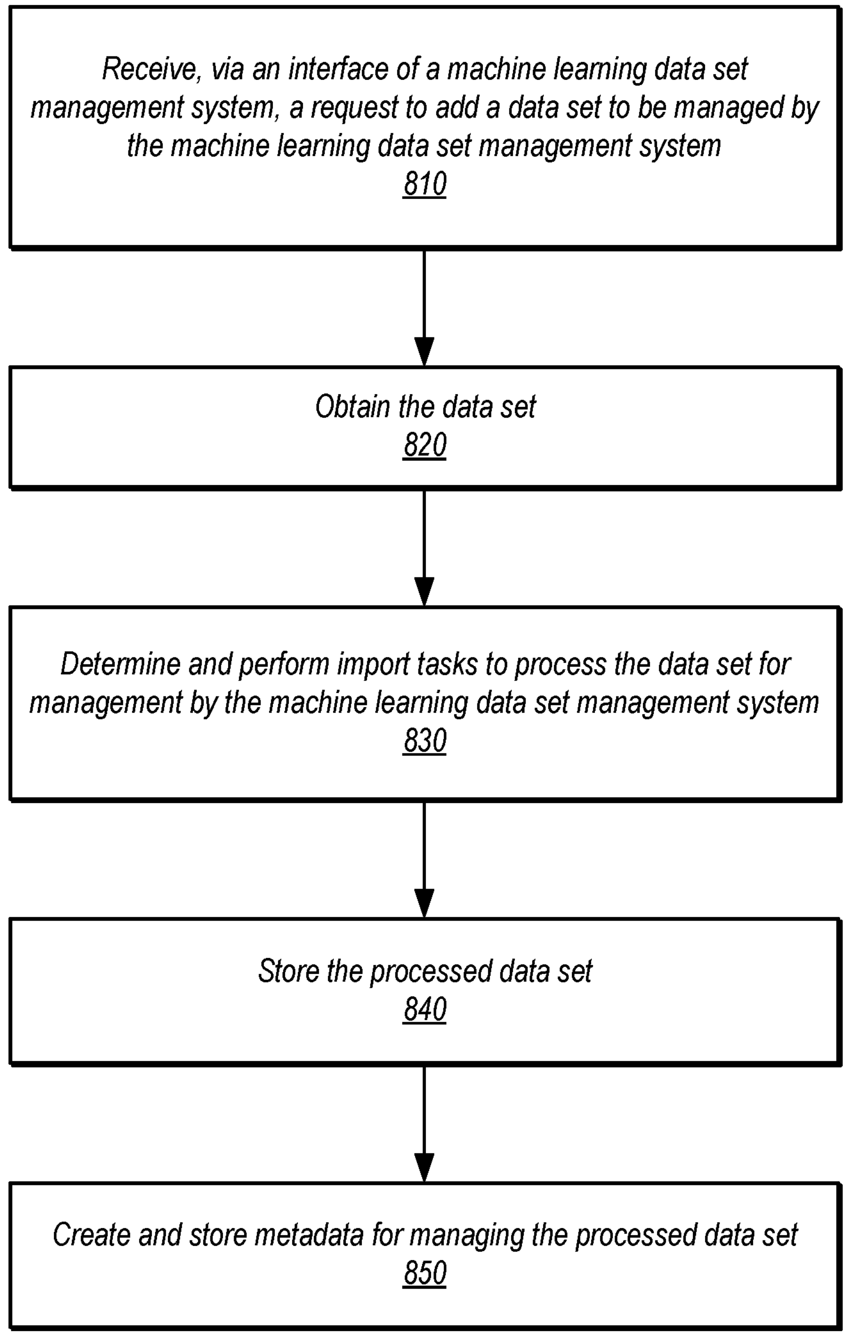
FIG. 8 is a high-level flowchart illustrating various methods and techniques for data sets for management at a data set management system for machine learning, according to some embodiments.

FIG. 8 is a high-level flowchart illustrating various methods and techniques for adding data sets, according to some embodiments. As indicated at 810, a request to add a data set to be managed by the machine learning data set management system may be received, via an interface of a machine learning data set management system, in some embodiments. For example, the request may specify a storage location, file type, and/or various other descriptive information of the data set. The request may provide access credentials or other permissions, in some embodiments. The request may specify various import processing tasks (or none) to perform upon the data set as part of adding the data set, in some embodiments.

As indicated at 820, the data set may be obtained. For example, various data movement protocols, tasks, or operations may be performed, such as copy file requests, copy object requests, import requests, read request, or other request as may be supported by various plug-ins, interfaces, or protocols managed by the machine learning data set management system. Once obtained (e.g., in an import processing storage location or in the final storage location), import tasks may be determined and performed to process the data set for management by the machine learning data set management system. For example, statistical, automated machine learning, data object labeling, and data object anonymization techniques may be performed. As noted earlier, determination of these tasks may be specified as one or more parameters in the request to add the data set.

As indicated at 840, the processed data set may be stored. For example, the data set may be stored in a data storage system (or multiple storage systems) corresponding to the type of data set (e.g., text into a text search and storage system, images into an object file/key value store, records into a database system, etc.). As indicated at 850, metadata for managing the processed data set may be created and stored. For example, the various records, data structures or other information used to track accesses or other lineage data may be set up. A table, index, or other structure for maintaining and/or searching the data set may be created or added.

The methods described herein may in various embodiments be implemented by any combination of hardware and software. For example, in one embodiment, the methods may be implemented on or across one or more computer systems (e.g., a computer system as in FIG. 9) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
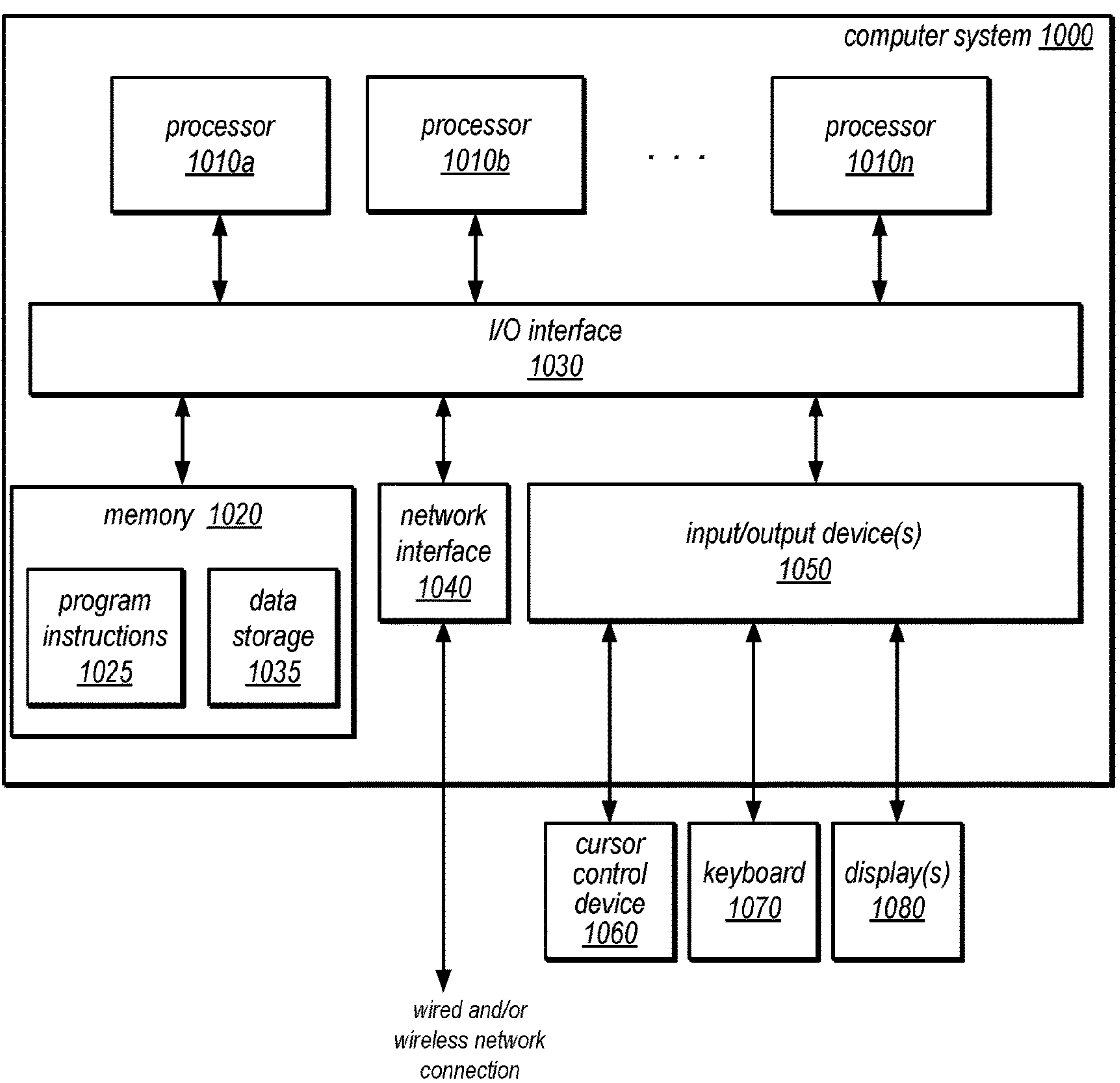
FIG. 9 illustrates an example system to implement the various methods, techniques, and systems described herein, according to some embodiments.

Embodiments of performing explanation jobs for computer vision tasks as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphic s processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to:

store, by a machine learning data set management system, a plurality of data sets respectively comprising a plurality of data objects with respective labels and respective metadata describing the one or more data sets;

receive, via an interface of the machine learning data set management system, a request to search the plurality of data sets according to one or more search criteria;

provide, via the interface of the machine learning data set management system, one or more data sets of the plurality of data sets identified based, at least in part on:

respective access rights of the plurality of data sets that allow sharing of the one or more data sets with an identity associated with the request to search the plurality of data sets; and one or more search criteria;

receive, via the interface of the machine learning data set management system, a request to create a new data set to be made available for access by one or more machine learning applications, the new data set to be a subset of the one or more data sets, wherein the request specifies one or more labels used to identify one or more data objects from the plurality of data objects in the one or more data sets to create the new data set;

responsive to the request:

determine, by the machine learning data set management system, that the one or more data sets allow creation of the new data set based at least in part on the respective access rights and the identity:

search, by the machine learning data set management system, the respective metadata describing the one or more data sets and the respective labels of the plurality of data objects included in the one or more data sets according to the specified one or more labels, wherein to search, the machine learning data set management system:

compares the respective labels of the plurality of data objects to identify the one or more data objects that match at least one of the specified one or more labels to include in the new data set;

create, by the machine learning data set management system, the new data set that includes the identified one or more data objects from the one or more data sets; and after creation of the new data set, make, by the machine learning data set management system, the new data set available for access by the one or more machine learning applications.

2. The system of claim 1, wherein the memory stores further program instructions that when executed by the at least one processor, cause the at least one processor further to update lineage data for the new data set after determining that the new data set has been accessed by one of the one or more machine learning applications.

3. The system of claim 1, wherein the memory stores further program instructions that when executed by the at least one processor, cause the at least one processor further to:

receive, via the interface of the machine learning data set management system, a request to add the one or more data sets to be managed by the machine learning data set management system;

obtain, by the machine learning data set management system, the one or more data sets;

determine and perform, by the machine learning data set management system, one or more import tasks to process the data set for management by the machine learning data set management system;

create and store, by the machine learning data set management system, metadata for managing the processed data set.

4. The system of claim 1, wherein the machine learning data set management system is a service offered by a provider network, wherein the one or more data sets are stored as part of a storage service of the provider network, wherein the new data set is stored as part of the storage service of the provider network, and wherein the one or more machine learning applications are one or more machine learning services of the provider network.

5. A method, comprising:

receiving, via an interface of the machine learning data set management system, a request to search the plurality of data sets according to one or more search criteria;

providing, via the interface of the machine learning data set management system, one or more data sets of the plurality of data sets identified based, at least in part on:

respective access rights of the plurality of data sets that allow sharing of the one or more data sets with an identity associated with the request to search the plurality of data sets; and one or more search criteria;

receiving, via the interface of a machine learning data set management system, a request to create a new data set to be made available for access by one or more machine learning applications, the new data set to be a subset of the one or more data sets, wherein the request specifies one or more labels used to identify one or more data objects from a plurality of data objects stored in the one or more data sets to create the new data set;

responsive to the request:

determining, by the machine learning data set management system, that the one or more data sets allow creation of the new data set based at least in part on the respective access rights and the identity;

searching, by the machine learning data set management system, respective labels of the plurality of data objects included in the one or more data sets according to the specified one or more labels, wherein the searching comprises comparing the respective labels of the plurality of data objects to identify the one or more data objects that match at least one of the specified one or more labels to include in the new data set;

creating, by the machine learning data set management system, the new data set that includes the identified one or more data objects from the one or more data sets; and after creating the new data set, making, by the machine learning data set management system, the new data set available for access by the one or more machine learning applications.

6. The method of claim 5, further comprising updating lineage data for the new data set after determining that the new data set has been accessed by one of the one or more machine learning applications.

7. The method of claim 5, further comprising granting access to the new data set to one or more additional users of the machine learning data set management system, wherein the new data set was created on behalf of a first user of the machine learning data set management system.

8. The method of claim 5, further comprising:

receiving, via the interface of the machine learning data set management system, a request to add the one or more data sets to be managed by the machine learning data set management system;

obtaining, by the machine learning data set management system, the one or more data sets;

determining and performing, by the machine learning data set management system, one or more import tasks to process the data set for management by the machine learning data set management system;

storing, by the machine learning data set management system, the processed one or more data sets; and creating and storing, by the machine learning data set management system, metadata for managing the processed data set.

9. The method of claim 8, further comprising performing one or more statistical analyses on the one or more data sets to determine at least some of the metadata for the one or more data sets.

10. The method of claim 8, further comprising performing one or more machine learning analyses on the one or more data sets to modify the one or more data sets.

11. The method of claim 5, wherein the one or more search criteria is a query that specifies at least one label for data objects.

12. The method of claim 5, wherein one of the one or more machine learning applications is a data labeling application, wherein the data labeling application is provided access to the new data set to perform a data labeling job to add one or more labels to different ones of the data objects in the new data set.

13. The method of claim 5, further comprising displaying, via the interface of the machine learning data set management system, lineage data for the new data set responsive to a request for lineage data for the new data set received via the interface of the machine learning data set management system.

14. One or more non-transitory, computer-readable storage media, storing program instructions that when executed on or across one or more computing devices cause the one or more computing devices to implement:

receiving, via an interface of the machine learning data set management system, a request to search a plurality of data sets according to one or more search criteria;

providing, via the interface of the machine learning data set management system, one or more data sets of the plurality of data sets identified based, at least in part on:

respective access rights of the plurality of data sets that allow sharing of the one or more data sets with an identity associated with the request to search the plurality of data sets; and one or more search criteria;

receiving, via the interface of a machine learning data set management system, a request to create a new data set to be made available for access by one or more machine learning applications, the new data set to be a subset of the one or more data sets, wherein the request specifies one or more labels used to identify one or more data objects from the plurality of data objects in the one or more data sets to create the new data set;

responsive to the request:

determining, by the machine learning data set management system, that the one or more data sets allow creation of the new data set based at least in part on the respective access rights and the identity:

searching, by the machine learning data set management system, respective labels of the plurality of data objects included in the one or more data sets according to the specified one or more labels, wherein the searching comprises comparing the respective labels of the plurality of data objects to identify the one or more data objects that match at least one of the specified one or more labels to include in the new data set;

creating, by the machine learning data set management system, the new data set that includes the identified one or more data objects from the one or more data sets; and after creating the new data set, making, by the machine learning data set management system, the new data set available for access by the one or more machine learning applications.

15. The one or more non-transitory, computer-readable storage media of claim 14, wherein the new data set is provided to a first machine learning application and a second machine learning application, and wherein the non-transitory, computer- readable storage media store further program instructions that when executed on or across the one or more computing devices, cause the one or more computing devices to further providing a performance comparison of the first machine learning application and the second machine learning application with respect to the new data set via the interface of the machine learning data set management system.

16. The one or more non-transitory, computer-readable storage media of claim 14, storing further program instructions that when executed on or across the one or more computing devices, cause the one or more computing devices to further implement:

receiving, via the interface of the machine learning data set management system, a request to add the one or more data sets to be managed by the machine learning data set management system;

obtaining, by the machine learning data set management system, the one or more data sets;

determining and performing, by the machine learning data set management system, one or more import tasks to process the data set for management by the machine learning data set management system;

storing, by the machine learning data set management system, the processed one or more data sets; and creating and storing, by the machine learning data set management system, metadata for managing the processed data set.

17. The one or more non-transitory, computer-readable storage media of claim 16, storing further program instructions that when executed on or across the one or more computing devices, cause the one or more computing devices to further implement performing one or more machine learning analyses on the one or more data sets to modify the one or more data sets as part of performing the import tasks determined for the request to add the one or more data sets to be managed by the machine learning data set management system.

18. The one or more non-transitory, computer-readable storage media of claim 16, storing further program instructions that when executed on or across the one or more computing devices, cause the one or more computing devices to further implement anonymizing the one or more data sets as part of performing the import tasks determined for the request to add the one or more data sets to be managed by the machine learning data set management system.

19. The one or more non-transitory, computer-readable storage media of claim 14, storing further program instructions that when executed on or across the one or more computing devices, cause the one or more computing devices to further implement generating one or more synthetic data objects to include in the new data set.

20. The one or more non-transitory, computer-readable storage media of claim 14, wherein the machine learning data set management system is a service offered by a provider network, wherein the one or more data sets are stored as part of a storage service of the provider network, wherein the new data set is stored as part of the storage service of the provider network, and wherein the one or more machine learning applications are one or more machine learning services of the provider network.

* * * * *